J. W. & J. HAYWOOD.
FRICTION TRANSMISSION GEARING.
APPLICATION FILED FEB. 20, 1912.

1,176,550.

Patented Mar. 21, 1916.

UNITED STATES PATENT OFFICE.

JOHN W. HAYWOOD AND JOHN HAYWOOD, OF NEWARK, NEW YORK; SAID JOHN W. HAYWOOD ASSIGNOR TO SAID JOHN HAYWOOD.

FRICTION TRANSMISSION-GEARING.

1,176,550.   Specification of Letters Patent.   Patented Mar. 21, 1916.

Application filed February 20, 1912.   Serial No. 678,829.

*To all whom it may concern:*

Be it known that we, JOHN W. HAYWOOD and JOHN HAYWOOD, of Newark, in the county of Wayne and State of New York, have invented a certain new and useful Friction Transmission-Gearing, of which the following is a specification.

This invention has for its object the production of a friction transmission gearing which is particularly simple in construction, highly efficient and durable in use, and it consists in the combinations and constructions hereinafter set forth and claimed.

In describing this invention reference is had to the accompanying drawing in which like characters designate corresponding parts in all the views.

Figure 1:
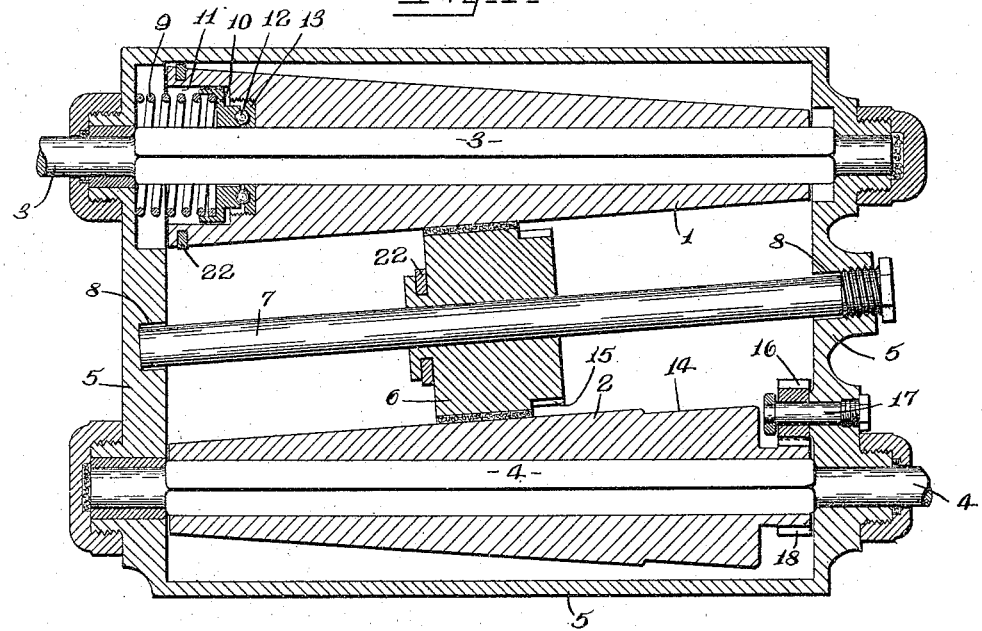
Figure 2:
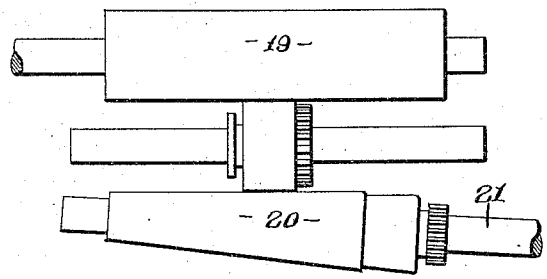
Figure 3:
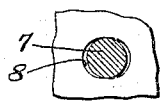

Figure 1 is a vertical sectional view of a gearing embodying our invention. Fig. 2 is an elevation of a modified form of our invention, the casing and other parts being removed. Fig. 3 is a fragmentary view illustrating one of the bearings for the rod supporting the shiftable pinion.

This transmission gearing comprises, generally, driving and driven rotary elements arranged with opposing portions of their peripheries in parallelism, one of said elements being conical, and a friction pinion interposed between and engaging the parallel portions of the peripheries and being shiftable axially to produce different speeds.

1 and 2 are respectively driving and driven rotary elements which are mounted respectively on shafts 3, 4, journaled in suitable bearings carried by opposite end walls of the inclosing case 5, one of said elements 1, 2 and preferably both being conical, and reversely arranged with respect to each other with opposing portions of their peripheries in parallelism.

6 is a friction pinion interposed between and engaging the parallel portions of the elements 1, 2, the pinion being mounted on a supporting or guide rod 7 engaged at its opposite ends with bearings 8 in opposite end walls of the case 5, said pinion being shiftable axially along said rod 7, in order to change the ratio of speed between the driving and driven elements. The bearings for the rod 7 are preferably elongated in a plane intersecting the axes of elements 1 and 2 and pinion 6, Fig. 3, for premitting movement of the rod laterally relatively to its axis, in order to take up the wear on its periphery.

Preferably one of the elements 1, 2 is shiftable for disengaging its periphery from the friction pinion 6 preliminary to the shifting of such pinion, and as here shown one of such elements, as the driving element 1 is shiftable axially on the shaft 3 and is normally pressed axially in one direction by a spring 9 for the purpose of holding its periphery in frictional engagement with the pinion 6 and automatically adjusting the element 1 to the lateral adjustment of the pinion in engagement with the shiftable element. The spring 9 is coiled about the shaft 3 and abuts against the inner face of one end wall of the casing, and against a non-rotatable collar 10 which is loosely mounted on the shaft 3 and located within the recess 11 in the larger end of the conical element 1. Antifriction thrust members 12 are interposed between the collar 10 and a bearing plate 13 fixed in the recess 11 and rotatable with the cone 1.

One of the elements 1, 2 here shown as the driven element 2, is formed with a circumferential depressed portion 14 near one end, such depressed portion operating to permit the pinion 6 to be disconnected from the driven element when shifted into a position opposite to the depressed portion, such depressed portion being of greater width than the periphery of the pinion.

Our transmission gearing also comprises reverse mechanism which preferably includes intermeshing spur gears. Said reverse mechanism comprises preferably means as a spur gear 15 associated with the shiftable pinion 6 and a toothed idler 16 carried by the stud 17 fixed in one end wall of the case, the idler 16 being permanently in mesh with a spur gear 18 associated with the cone 2 and located near the larger end thereof. Said idler is arranged to mesh with the gear 15 when the pinion 6 is shifted to the limit of its movement in one direction as to the right. The spur gear 15 associated with the friction pinion 6 is designed to be shifted into engagement with the idler 16 when the friction pinion is shifted to a position opposed to the depressed portion 14.

In Fig. 1, the driving and driven elements are shown as reversely-arranged cones rotatable about parallel axes, and in Fig. 2, is illustrated a construction in which the driving element 19 is a cylinder and the driven element 20 is a cone mounted on a shaft 21 arranged slightly inclined relatively to the axis of the cylinder 19 in order to bring opposing portions of the peripheries of the cylinder 19 and cone 20 in parallelism.

In operation the pinion 6 may be shifted along the shaft 7 into any desired position to produce different speeds or reverse speed, and preliminary to the shifting thereof, the driving element may be shifted axially against the action of its spring 9 in order that the friction pinion 6 may be shifted with minimum friction.

The pinion 6 and driving element 1 may be shifted by any suitable means comprising forks 22 working in annular grooves therein. The forks may be operated by a single lever or may be provided with independent levers.

Our friction transmission mechanism is particularly advantageous in that the shiftable pinion is disconnected from the driving element while such pinion is being shifted, the wear of the friction surfaces of the parts is automatically taken up, and further owing to the fact that the parts can be relieved of friction as by moving the driving element axially, the transmission mechanism performs the function of the disk or main clutch now usually embodied in automobiles.

What we claim is:—

1. A friction transmission gearing comprising a driven rotatable element, a driving shaft, a driving element mounted on the shaft for rotation therewith and having independent movement axially thereof, the driving and driven elements having opposing peripheral surfaces disposed in parallelism, and the driving element being of conical form, a friction pinion interposed between and engaging parallel portions of the surfaces of said elements and being shiftable axially, a spring tending to move the driving element in a direction to reduce the distance between the parallel portions of the surfaces of said elements and manual means for shifting the driving element in a reverse direction, substantially as and for the purpose described.

2. A friction transmission gearing comprising driving and driven rotatable elements arranged with opposing portions of their peripheries in parallelism, one of said elements being conical, a friction pinion interposed between and engaging the parallel portions of the peripheries of said elements and being shiftable axially, the conical element being also manually shiftable axially in one direction for moving its periphery out of engagement with the pinion, and a spring tending to move said conical element axially in the opposite direction for holding its periphery in engagement with the pinion, substantially as and for the purpose set forth.

3. A friction transmission gearing comprising driving and driven reversely arranged conical elements arranged with their axes extending in the same general direction, and with opposing portions of their peripheries in parallelism, and a friction pinion interposed between and engaging the parallel portions of the peripheries of said elements, one of the conical elements being shiftable axially, and a spring for moving said shiftable element axially in one direction, substantially as and for the purpose specified.

4. A friction transmission gearing comprising driving and driven rotatable elements arranged with opposing portions of their peripheries in parallelism, a friction pinion interposed between and engaging the parallel portions of the peripheries of said elements and being shiftable axially, and reversing means comprising an idler normally engaged with one of said elements and arranged in position to be engaged by the pinion, substantially as and for the purpose specified.

5. A friction transmission gearing comprising driving and driven rotatable elements arranged with opposing portions of their peripheries in parallelism, one of said elements being conical, and a friction pinion interposed between and engaging the parallel portions of the peripheries of said elements and being shiftable axially, and reversing means comprising a spur gear associated with the pinion, and an idler gear connected to one of said elements, the pinion being shiftable for moving the spur gear associated therewith into and out of mesh with the idler, substantially as and for the purpose set forth.

6. A friction transmission gearing comprising driving and driven rotatable elements arranged with opposing portions of their peripheries in parallelism, one of said elements being conical and formed with a circumferential depressed portion, and a friction pinion interposed between and engaging the parallel portions of the peripheries of said elements and being shiftable axially, the friction surface of the pinion being of less width than said depressed portion, and the pinion being disconnected from the conical element when the friction pinion is shifted into a position opposed to the depressed portion, and reversing means comprising means associated with the pinion, and an idler engaging with the conical element and adapted to engage said means, the idler being arranged to engage said means associated with the pinion when the shiftable pinion is opposed to said depressed portion, substantially as and for the purpose described.

7. A friction transmission gearing comprising driving and driven rotatable elements, arranged with portions of their peripheries in parallelism, one of said elements being conical and one element being shiftable for changing the distance between the peripheries of the elements, and a friction pinion interposed between and engaging the parallel portions of the peripheries of said elements and being shiftable axially, the pinion being automatically adjustable in a direction at an angle to its axis for taking up wear due to the frictional engagement with the driving and driven elements, substantially as and for the purpose set forth.

8. A friction transmission gearing comprising driving and driven rotatable elements arranged with opposing portions of their peripheries in parallelism, one of said elements being conical and shiftable for reducing the distance between opposing portions of the peripheries of said elements, a rod interposed between said elements, bearings for the rod constructed to permit lateral movement of the rod relatively to the opposing portions of the peripheries of said elements, and a friction pinion mounted on the rod and engaging the parallel portions of the peripheries of said elements and being shiftable axially of the rod, substantially as and for the purpose described.

9. A friction transmission gearing comprising driving and driven rotatable elements arranged with portions of their peripheries in parallelism, one of said elements being conical and manually shiftable axially in one direction, a spring for shifting the same axially in the opposite direction, and the conical element being normally under tension of the spring, and a friction pinion interposed between and engaging the parallel portions of the peripheries of said elements and being shiftable axially, substantially as and for the purpose described.

10. A friction transmission gearing comprising driving and driven elements arranged with opposing portions of their peripheries in parallelism, one of said elements being conical and shiftable axially a friction pinion interposed between and engaging the parallel portions of the peripheries of said elements and being shiftable axially, and a spring tending to shift the conical element axially in one direction, substantially as and for the purpose described.

11. A friction transmission gearing comprising driving and driven elements arranged with opposing portions of their engaging surfaces in parallelism, one of said elements being conical, a rod interposed between said elements, a friction pinion mounted on the rod and engaging the parallel portions of the surfaces of said elements, the pinion being shiftable axially and the rod being mounted to have a limited lateral movement to compensate for wear on said elements and the pinion, and the conical element being freely shiftable axially, and a spring for pressing the conical element in one direction to hold the same in engagement with the pinion and the pinion in engagement with the other element, substantially as and for the purpose described.

In testimony whereof, we have hereunto signed our names in the presence of two attesting witnesses, at Newark, in the county of Wayne, in the State of New York, this 14th day of February, 1912.

JOHN W. HAYWOOD.
JOHN HAYWOOD.

Witnesses:
HENRIETTA VOSBURGH,
GORDON G. HARRIS.

Copies of this patent may be obtained for five cents each, by addressing the "Commissioner of Patents, Washington, D. C."